April 30, 1968  W. J. BLEASDALE  3,380,480
SURGE CUSHIONING MEANS FOR HIGH PRESSURE FLUID SYSTEM
Filed April 21, 1966  2 Sheets-Sheet 1
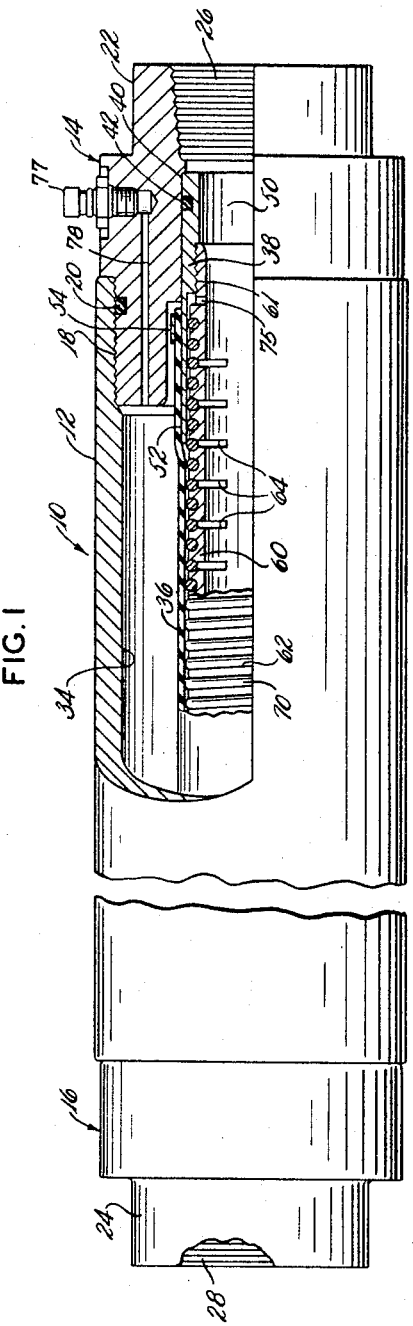
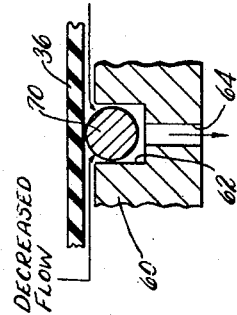
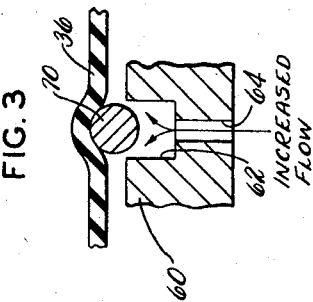
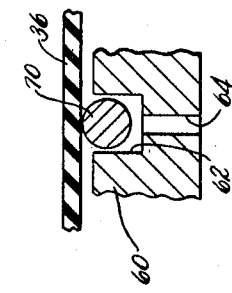
INVENTOR.
WILLIAM J. BLEASDALE
BY
Oldham & Oldham
ATTYS.

April 30, 1968   W. J. BLEASDALE   3,380,480
SURGE CUSHIONING MEANS FOR HIGH PRESSURE FLUID SYSTEM
Filed April 21, 1966   2 Sheets-Sheet 2

INVENTOR.
WILLIAM J. BLEASDALE
BY Oldham & Oldham
ATTYS.

United States Patent Office 3,380,480
Patented Apr. 30, 1968

3,380,480
SURGE CUSHIONING MEANS FOR HIGH
PRESSURE FLUID SYSTEM
William J. Bleasdale, Box 3625, Cleveland, Ohio 44119
Continuation-in-part of application Ser. No. 438,553,
Mar. 10, 1965. This application Apr. 21, 1966, Ser.
No. 544,267
11 Claims. (Cl. 138—30)

ABSTRACT OF THE DISCLOSURE

Cushioning means for a liquid pressure system including a liquid chamber and a fluid chamber with pressure liquid and pressure fluid being supplied to the respective chambers is provided. A flexible diaphragm is secured to the container intermediate the chambers. A diaphragm support is provided in the liquid chamber and such support has groove means therein on the side thereof adjacent the diaphragm and apertures connect the groove means to the opposite side of the diaphragm support. Means are positioned in the groove means and have lateral clearance.

---

This is a continuation-in-part of application Ser. No. 438,553, filed Mar. 10, 1965.

This invention relates to a cushioning means for a fluid system, and more particularly to a new and improved accumulator, or other member, attachable to a fluid system to substantially lessen pressure shocks caused in fluid systems due to pumping means, and sudden pressure changes in the system.

Heretofore, it has been known that there are many and varied types of accumulators to perform various functions in fluid pressure systems. Conventional accumulators, or similar members, usually consist of a container divided by an elastic partition or diaphragm into two chambers, one of which is intended to receive a gas under a preloaded pressure, the other one to receive, store or deliver a fluid, usually a liquid, according to the instantaneous fluid pressure prevailing in the system. The performance of the accumulator essentially depends on the ratio of the preload gas pressure to the maximum line pressure of the system, and performance of this ratio is almost totally dependent on the means available to easily and smoothly transmit the pressure differential between the preload gas pressure and the line pressure in the system. In the past, this has been accomplished by utilizing, directly connected to the hydraulic or fluid line, a rigid pipe-like member having a plurality of very small holes therein, with the elastic partition or diaphragm separating this pipe-like member from the gas pressure chamber. Thus, under operation, the fluid pressure change passing through the holes in the pipe-like member is slow, and inefficient. Further, the elastic partition or diaphragm tends to force itself into the holes when the line pressure is low thereby causing possible damage, or rupture of the elastic partition or diaphragm after a relatively short term of use. Thus, in the conventional prior systems the pressure cushioning is frequently slow, jerky, and unsatisfactory, and the possibility always exists that when the line pressure is exceedingly low, or a large number of pulses or shocks per hour is set up in the system, the diaphragm will rupture, because it is forced into the holes in the rigid pipe-like member.

It is the general object of the present invention to avoid and overcome the foregoing difficulties and other objections to prior art practices by the provisions of a cushioning means for a fluid system which utilizes an improved structural relationship between the elastic partition or diaphragm in the hydraulic line to provide a highly effective fluid cushioning means to eliminate shocks in fluid pressure lines caused by abrupt pressure changes in fluid systems, and which is further particularly adaptable to cushioning pulses which occur in numbers of 500,000 per hour or more resultant from valve action, pumping means, or other causes, and which new structure is inexpensive, durable, and highly effective.

Another object of the invention is to provide an improved accumulator or the like that is particularly adapted for use in high pressure systems and in systems having a large number of pressure variations per minute.

A further object of the invention is to provide surge cushioning apparatus where pressure increases are rapidly absorbed when novel orifice means and associated members are present in the apparatus.

A further object of the invention is to provide an improved cushioning means for fluid systems which includes a floating closely spaced, helically wound coil-like member in, or connected to the hydraulic fluid pressure line, which member lies coaxially inside a flexible elastic partition or diaphragm, and which is internally reenforced by a support tube having slits substantially in alignment with the coil-like member whereby fluid may flow outwardly through the slits under increased pressure, but where the coil-like member acts as a variable orifice to retard fluid flow back into the support tube under decreased fluid pressure thereby effecting smooth, but rapid pressure changes between the line and the diaphragm without an excessive load on the diaphragm caused by a large number of pulses per unit time.

A further object of the invention is to provide an accumulator which will effect superior hydraulic cushioning and/or pressure maintenance action under pressure pulse changes in great numbers, which accumulator is highly durable, of uncomplicated construction, and in expensive.

The aforesaid objects of the invention and other objects which will become apparent as the description proceeds are achieved by providing in an accumulator, or similar means in a hydraulic system, as one embodiment of the invention, the combination of a substantially cylindrical open ended container, a flexible tubular diaphragm of elastic material coaxially arranged within the container, connecting means received in the container at each end thereof, a helical wound metal coil means extending coaxially inside the diaphragm and operatively secured at each end to the connecting means which connecting means are connectable to a hydraulic system or the like, a support tube on which the coil means is positioned, said tube having a helically shaped recessed groove there around with a plurality of slots, or apertures therethrough which groove is in alignment with and substantially receives the coil means which coil means acts as a variable orifice valve relative to the slots so that pressure passing into the support tube through the apertures flows easily out through the slots, but its retarded in flow into the tube through the slots, and means to pass a pressure fluid into the container between the outer surface of the diaphragm and the inner surface of the container.

For a better understanding of the invention, reference should be had to the accompanying drawings, wherein:

FIGURE 1 is a partial longitudinal section, partial broken away elevation, of a preferred embodiment of apparatus employing the principles of the invention;

FIGURE 2 is a broken away enlarged cross sectional elevation of a spring associated with the recessed groove under normal pressure operating conditions;

FIGURE 3 is similar to FIGURE 2, but under high pressure operating conditions;

FIGURE 4 is similar to FIGURE 2, but under low pressure operating conditions;

Figure 5:
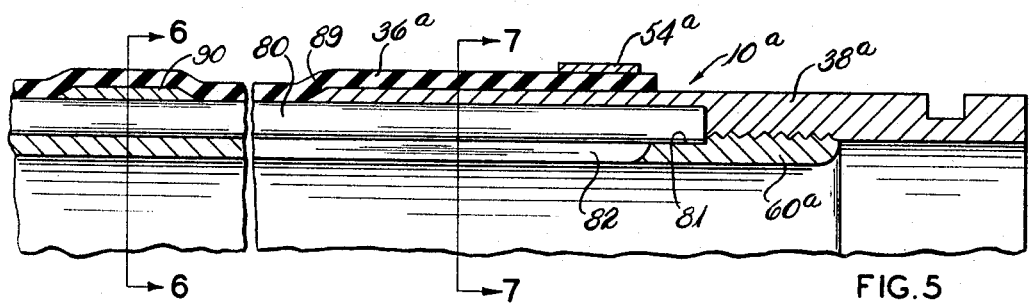
FIGURE 5 is a fragmentary, enlarged longitudinally extending vertical section of a portion of the modified accumulator of the invention, with portions thereof being removed for clarity.

Although the principles of the invention are broadly applicable to any means, or an accumulator which may have only one end thereof connected to a hydraulic pressure line for shock absorbing action, it also relates to means functioning as a thermal compensator, or as a leakage compensator, but the apparatus and means of the invention are usually employed as an accumulator usually connected at both ends to a hydraulic or gaseous fluid pressure line. Hence, the invention has been so illustrated and will be so described.

With specific reference to the form of the invention illustrated in the drawing, the numeral 10 indicates generally an apparatus that may be termed an accumulator comprising a tubular body, cylinder or container 12 and two end pieces or headers 14 and 16 secured to the container 12 as by thread means indicated at 18 for the header 14. In order to provide for the required strength, the container 12 and headers 14 and 16 are preferably made of high strength alloyed steel. However, if it were desired to make the accumulator lightweight, the headers 14 and 16 could be made from other materials, such as high strength aluminum, or aluminum alloyed forgings. A leakproof joint between the container 12 and the header 14 may be obtained by providing a conventional O-ring seal 20, or similar means, respectively, between the connected parts. The invention contemplates that the container 12 and headers 14 and 16 may be formed as one integral piece.

The headers 14 and 16 have reduced diameter ends 22 and 24, respectively, which provide apertures 26 and 28 for the admission and discharge of the hydraulic liquid or fluid from lines (not shown) connected to a fluid system with which the accumulator is used. The combination of the container 12 and headers 14 and 16 defines a chamber 34.

Coaxially aligned with the container 12 within the chamber 34 is a flexible partition, or tubular diaphragm 36. The diaphragm 36 must have an elasticity to alter its size, preferably without wrinkling, and must be impermeable to the medium, generally air, or an inert gas such as nitrogen, surrounding its outer surface, and the medium, generally hydraulic liquid, contacting its inner surface.

In order to operatively connect the diaphragm 36 to the aperture 26 suitable means such as a pipe-like connecting member 38 is provided. The member 38 is removably received in a counterbored recess 40 in the header 14 as shown. To achieve a seal between the member 38 and the header 14, an O-ring seal 42, or an equivalent, may be provided. The member 38 may be positioned in the header 14 in any suitable manner.

As seen in the sectioned portion of the drawing of FIGURE 1, the bore through the member 38 defines an inner chamber with the diaphragm 36 as indicated generally by a numeral 50, which is operatively aligned in registry with the aperture 26. For the purpose of securing the diaphragm 36 to the member 38, an annular flange 52 is provided on the inward end thereof. A pressed clamp band 54, or equivalent means, completes the seal of the end of the diaphragm 36 to the member 38. Of course, the same arrangement is utilized at the other end of the accumulator 10 for securing the diaphragm 36 to the header 16.

As an important feature of the invention, a metal support tube 60 for the diaphragm 36 is removably received in a threaded portion 61 of the member 38 and extends in axial concentric alignment from one end of the accumulator to the other. The tube 60 has a square cut thread, or helical recess 62 extending completely around the external surface thereof for most of the length thereof with a plurality of apertures, usually slots 64 extending from the bottom of certain portions of the thread or recess 62 through the wall of the tube 60 and therefore into the inner pressure chamber, or bore 50 of the accumulator.

A helically wound coil 70 extends coaxially inside the diaphragm 36 and outside of the tube 60 so that each convolution thereof falls into aligning engagement with the convolutions of the helical recess 62 on the tube 60. The coil ends and convolutions are free to move relative to the tube 60, and the spring or coil 70 is shorter in axial length than the thread 62. It is preferred that the internal diameter of the spring 70 will be slightly greater than the external diameter of the recess, or groove 62 so that there will be a few thousandths clearance between the internal diameter of the spring 70 and the base of the groove 62. Further, as shown in FIGURE 2, the width of the wire in each coil of the spring 70 will be slightly less than the width of the recessed groove 62 so that there will be a sliding action and some clearance therebetween. Some acceptable clearances, for example, might be about several thousandths of an inch between the base of the recessed groove 62 and the convolutions of the spring 70 and about .006 inch total clearance between both sides of the groove 62 and the spring 70. The O.D. of the spring may, for example, be about .015 inch greater than the O.D. of the tube 60.

Thus, during operational use of the accumulator 10, the spring 70 acting in conjunction with the recessed groove 62 and the slots 64 will provide a variable orifice flow of fluid through the slots 64. For example, as shown in FIGURE 3 with an increased pressure in the inner chamber 50, it will tend to force the spring 70 outwardly causing an increase in the orifice area of flow and allowing fluid to flow rapidly thereout. Conversely, with reference to FIGURE 4 when pressure in the inner chamber 50 decreases, the spring 70 will tend to be clamped down and close off a good portion of the area of the slots 64 thus substantially decreasing the fluid flow back into the chamber 50. Of course, it is to be understood that the spring 70 is not a complete check valve and that fluid can flow past and through the slots 64 into the chamber 50. Nevertheless, the spring 70 in conjunction with the recessed portion 62 and the slots 64 does provide a variable orifice flow where the flow back is slower than the flow out. It is believed that it is this ability to dampen the back and forth flow through the slot 62, thereby dampening flexing of the diaphragm 36 that enables this accumulator to provide cushioning action even where the number of pulses is 500,000 per hour or more.

Of course, the size and number of the apertures or slots 64 relative to the size of the spring 70 controls the orifice action. Normally the invention contemplates that the slots 64 will be of a lesser width than the diameter of the wire forming the spring 70.

In order to allow for the expansion and contraction of the spring 70, the ends thereof are slidably received in the recess or groove 62, but the spring is of a size and strength and it permits rapid fluid flow thereby so that it is prevented from popping out or being displaced upon even an extreme increase in pressure causing a considerable expansion of the spring 70. Also, the annular flange 52 of the member 38 is greater in internal diameter than the outer diameter of the spring to allow the sliding action of the ends of the spring 70 without permitting them to pop out of the groove 62.

An accumulator of the type described above has been found acceptable for use with either liquid or gaseous fluids in pressure ranges from 500 lbs. to about 5,000 lbs. pe rsquare inch with pulsations per hour between about 500,000 to about 1,500,000. Of course, the spring 70 also prevents the rubber or other elastic material diaphragm 36 from pressing down into the groove 62 and slots 64 to cause extreme stresses, pinching or bending of the diaphagm which lead to ruptures when so many pulses per hour are applied at high pressures, or when the gas pressure exceeds the oil pressure.

As a further feature of the invention, end holes or slots 75 in the wall of the tube 60 are provided at or adjacent the ends of the groove 62. The holes or slots 75 are formed in the base of the groove 62 axially beyond the ends of the spring 70. This insures that there will be continuously open orifices extending from the bore 50 to the inner surface of the diaphragm at all times. Such orifices are protected by the annular flange 52 from the diaphragm 36, and the flange 52 is radially spaced from the tube 60.

Suitable valve means 77 may be secured to the header 14 to supply the chamber 34 with fluid under pressure, as desired, through a bore 78 provided in the header and connecting to the valve 77. Generally, the chamber 34 will be maintained at a pressure slightly lower than the usual hydraulic line pressure to maintain the proper cushioning action desired.

As indicated, the groove 62 is a thread which may be cut or otherwise formed in the tube 60. The thread preferably has flat sidewalls, and any suitable base shape. It may be a square or rectangular thread for receiving the coil or coil spring 70 that usually is formed from a wire of circular shape in section but may be made from a wire of square or rectangular shape in section.

It should be noted that the total area of the slots 64 normally appreciably exceeds the area of the bore 50 or inlet 26. For example, a 2 inch tube 60 could be used and it may be from about 16 inches to about 36 inches long. The slots 64 may be 1/16 inch wide and about 1½ inches long with two slots being formed in each thread convolution. Hence, if for example, the 16 inch tube has 29 slotted threads plus two threads with end holes 80 therein, the area of the variable orifices would be .062" x 1½" x 58=5.39 square inches while the tube area would be 3.1416 square inches.

In FIGURE 1 of the drawings, the relationship between the coil spring 70 and the flat side wall thread or groove formed in the tube 60 is shown to such reduced form that it is difficult to appreciate the particular relationship between these elements. Such size relationship is shown better in enlarged FIGURES 2, 3 and 4, but which drawings are not necessarily to exact scale.

It also is possible to form a plurality of independent, usually parallel, grooves in lieu of the continuous helical groove 62. Then a plurality of separate split rings, or similar means, would be individually positioned in the separate transversely directed grooves, preferably with the split ends being spaced circumferentially from any aperture through the tube wall at the base of the groove.

It should be realized that, in practice, the square cut threads 62, or equivalent means provided in the accumulator of the invention, preferably have the radially outer edges of these threads curved slightly, such as on a radius of .002 to .005 inch, so as to avoid sharp corners in the accumulator as such sharp corners might have an abrasive, tearing, or cutting action on the resilient sleeve 36.

It also will be realized that usually an inert gas is provided in the chamber 34 formed within the outer sleeve 12 of the accumulator between such sleeve and the radially outer surface of the resilient sleeve 36 as gas preferably is used to provide the back-up pressure in the system.

Figure 6:
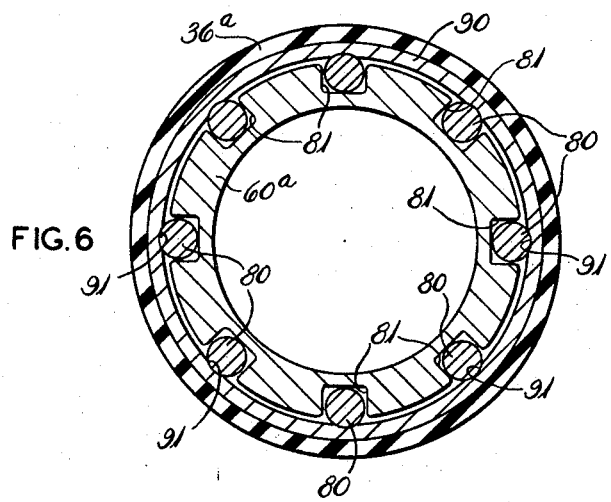
FIGURE 6 is a vertical section taken on line 6—6 of FIGURE 5.
Figure 7:
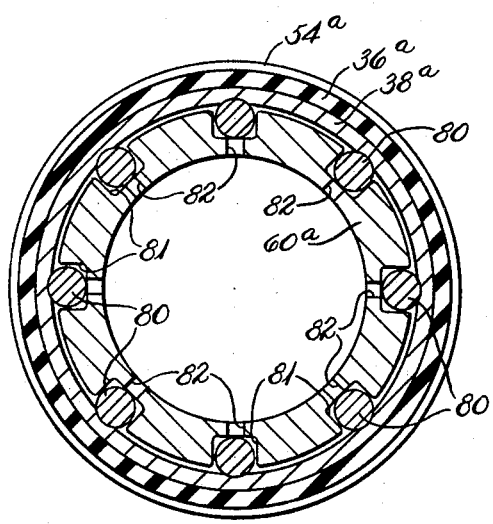
FIGURE 7 is a vertical section, like FIGURE 6, but taken on line 7—7 of FIGURE 5.

FIGS. 5 through 7 of the drawings show a modification of the invention wherein longitudinally extending springs, or rods 80 are provided in an accumulator 10a and function in a manner similar to the coil means referred to hereinbefore. Thus, these figures of the drawings show that in this instance a support tube 60a is provided and it has a plurality of longitudinally extending slots or grooves 81 formed in equally spaced peripheral portions of the tube 60a forming the center member in the accumulator. Such grooves 81 would extend substantially the full length, but not the total length of the tube 60a, and these grooves 81 are provided with longitudinally extending slots or other apertures 82 in portions thereof that extend from the bottom of the groove to the interior of the tube 60a for flow of liquid from the bore of the tube 60a into a confined area around the periphery of the tube for pressure cushioning action. Any suitable number of grooves 81 may be provided and the length of the slots 82 is such that the total slot area may equal or exceed the area of the tube 60a.

The drawings, while somewhat exaggerated in size in the relationship of the various components of the accumulator, normally would use resilient rods 80 that had a diameter of approximately one eighth of an inch, for example. These rods, or springs could be made from any suitable material such as metal, or Fiberglas composition, and the rods could either be solid or of tubular construction, as desired. The slots 82 are of such size as to avoid any serious weakening of the tube 60a under extreme inward pressure such as may be applied by the inert gas contacting the periphery of the resilient sleeve 36a and usually the rods protrude slightly radially out of the grooves. The rods 80 normally have a few thousandths of an inch lateral clearance in the grooves 81, and normally the rods 80 are larger in diameter than the width of the slots 82, but yet such rods, grooves and associated means provide a restricted orifice for rapid flow of pressure fluid through the slots 82 and around the rods 80 into the compartment provided by the resilient sleeve 36a, as the rods are forced away from the slots 82 when pressures exceeding the gas pressure exist in the support tube. The sleeve 36a is secured to suitable means, such as end tubes or connector members 38a, as by means of clamping bands or straps 54a, as indicated in the drawings, and applies a resilient confining force to the rods 80. The actual tube 60a usually has the end members or connectors 38a secured thereto, as by a threaded connection formed therebetween. It will be realized that the outer diameter of the connector members 38a is but slightly larger than the outer diameter of the tube 60a and that the end of such connector tube may be beveled as indicated at 89 to provide a smooth edge surface over which the resilient sleeve 36a extends to provide its normal confining action on the rods 80 in the assembly. Such connector members may have axially extending recesses to receive part of the rods therein. The rods 80 are free to move slightly longitudinally with flexure of the rods.

The radii provided at the outer corners of the grooves 81 are shown in somewhat exaggerated form in the drawings, but very slight radii are preferably provided at these corners, as indicated hereinabove, to avoid the provision of sharp means in the accumulator.

Members like the tube 12 and end connectors 22 and 24 of FIGURE 1 are provided in association with the means shown in FIGURES 5 through 7 for completing the accumulator of the invention, but are removed in these views for clarity.

As another feature of the apparatus shown in FIGURES 5 through 7, a restraining band or sleeve 90 may be provided in the accumulator 10a of the invention. Such bands or sleeves 90, of which one or more may be provided, are adapted to engage the rods 80 intermediate the ends thereof and limit expansion and movement thereof out of their associated grooves 81. The ends of these bands 90, which are of relatively short axial length, may be beveled or tapered to provide a smooth end portion over which parts of the resilient sleeve 36a will extend. Such bands 90 may be provided with arcuate recesses 91 extending axially thereof for engaging an arcuate peripheral portion of the rods 80 associated therewith. By use of one or more of the bands 90, any undesired flexure of the rods 80 such as might move them too far circumferentially of the support tube 60a, is thus avoided. The band or bands 90 would permit at least a few thousandths of an inch radial movement of the rods 80 at the band.

Some of the rods 80 may be slightly shorter than the rod shown in FIGURE 5 and the associated slot or aperture in the support tube may be formed in the unoccupied area of the groove 81 to facilitate flow of some pressure liquid out from the bore of the connecting member 38a in a manner similar to the unit of FIGURE 1.

It will be realized that the modified accumulator of the invention will function in a manner very similar and equivalent to that of the type of accumulator shown in FIGURES 1 through 4 of the drawings, and where the resilient spring-like member provided in the unit will function to control but yet permit rapid flow of the pressure liquid from the interior of the fluid system out through the support tube in the accumulator into the expansible chamber provided by the resilient sleeve in the apparatus. Such sleeve is sealed at both ends from the inert gas chamber provided in the accumulator, but yet provides a resilient means for cushioning shocks set up in the hydraulic system and the accumulator is designed to have a long service life.

It should be noted that the accumulator of the invention could be placed in the hydraulic pressure line at only one end with the other end fully sealed and the purposes and advantages of the invention would still be realized.

What is claimed is:

1. Means for use with a liquid pressure system for pressure storage and/or cushioning action with the system and comprising
   a container means connectable to the liquid system to receive pressure liquid therefrom,
   a flexible diaphragm secured to said container means in sealed engagement therewith to form a pressure chamber within said container means sealed from the liquid system,
   said container having an inlet opening therein adapted to be connected to a pressure fluid for supplying pressure fluid to said pressure chamber,
   a support means for said diaphragm positioned in said container means intermediate said diaphragm and said liquid system and exposed to said liquid system, said support means having groove means formed on a surface thereof adjacent said diaphragm with a plurality of apertures connecting the groove means to the other side of the support means opposite said diaphragm, and
   means positioned on said support means in said groove means, said means having lateral clearance in said groove means and normally being resiliently positioned substantially completely within said groove means.

2. Means according to claim 1 where said groove means comprise a plurality of independent longitudinally extending grooves formed in said support means and said last-named means comprise independent resilient members positioned in all of such grooves.

3. Apparatus as in claim 1 where the support means are tubular and the total area of said apertures exceeds the cross-sectional bore of said support means.

4. Apparatus for use with a fluid system for pressure storage and/or cushioning action with the system and comprising
   a container means connectable to the fluid system to receive pressure fluid therefrom,
   a flexible tubular diaphragm secured to said container means in sealed engagement therewith to form an outer chamber within said container means sealed from the fluid system,
   means forming a part of the container means for filling the outer chamber with a pressure fluid,
   a tubular support means for said diaphragm positioned within said container means and within said diaphragm to form an inner chamber, said support means receiving said pressure fluid therein and having an elongate helical external thread having flat sides and a flat base formed thereon, said support means having a number of apertures extending through the wall thereof at said base of said thread, and
   coil spring means surrounding the outer surface of said support means and substantially completely received in said thread in substantial radial alignment with the apertures in said support means, said coil spring means being free to move relative to the support means to act as a flow throttling means relative to said apertures whereby said spring means expands upon an increase in pressure in the inner chamber allowing a greater fluid flow through the apertures in the support means whereas the spring means compresses further into the thread for decreasing said fluid flow upon a decrease in pressure in the inner chamber within the container.

5. Means according to claim 4 which includes means to pass fluid in a non-restricted flow to the diaphragm from the interior of the support means.

6. Means according to claim 4 which includes an annular flange surrounding the coil spring means at least on the ends thereof in loose relationship to allow sliding movement of the coil spring means in the helical groove of the support means, but to keep the coil spring means from coming out of the helical groove.

7. A means according to claim 4 where the coil spring means is of slightly greater normal diameter than the diameter of the support means at the base of the recessed helical groove, and further where the diameter of the wire in the coil spring means is greater than the width of said apertures.

8. Apparatus as in claim 4 where
   said container means has open ends,
   headers are engaged with each end of said container means, and an aperture extends axially through each header,
   seal means are provided between said headers and said container means, and
   said diaphragm and said support tube are operatively connected in sealed relationship to said headers and said support tube is adapted to receive pressure fluid through the apertures in each header.

9. Means according to claim 2 where means are present at the ends of said resilient members and intermediate the ends of such members to retain them in said groove means at such portions thereof.

10. Means for use with a liquid pressure system for pressure storage and/or cushioning action with the system and comprising:
    a container means including a liquid chamber and a fluid chamber, each having an inlet connection, with respective pressure liquid and pressure fluid adapted to be supplied thereto,
    a flexible diaphragm secured to said container in sealed relation intermediate said liquid and fluid chambers,
    a diaphragm support, mounted on said container within said liquid chamber, having groove means formed thereon on the side thereof adjacent said diaphragm and a plurality of apertures connecting the groove means with the side of the support opposite the diaphragm, and
    means positioned on said support means in said groove means, said means having lateral clearance in said groove means and normally positioned substantially completely within said groove means.

11. Means for use with a liquid pressure system for pressure storage and/or cushioning action with the system and comprising:
    a container means including a liquid chamber and a fluid chamber, each having an inlet connection, with respective pressure liquid and pressure fluid adapted to be supplied thereto, a flexible diaphragm secured to said container in sealed relation intermediate said liquid and fluid chambers, a diaphragm support, mounted on said container within said liquid chamber, having groove means formed thereon on the side thereof adjacent said diaphragm and a plurality of apertures connecting the groove means with the side of the support opposite the diaphragm, and means positioned on said support means in said groove means, said means having lateral clearance in said groove means and limitedly movable in said groove means and positioned substantially completely within said groove means, said means in said grooves together with said side of said support adjacent said diaphragm providing a surface engageable by one side of said diaphragm.

References Cited

UNITED STATES PATENTS

| | | | |
|---|---|---|---|
| 145,964 | 12/1873 | Nichols. | |
| 659,456 | 10/1900 | Smith. | |
| 2,712,831 | 7/1955 | Day | 138—26 |
| 3,063,470 | 11/1962 | Forster | 138—30 |
| 3,103,234 | 9/1963 | Washburn | 138—30 |
| 3,161,208 | 12/1964 | Mercier | 138—30 |
| 3,276,477 | 10/1966 | Bleasdale | 138—30 |
| 3,276,478 | 10/1966 | Bleasdale | 138—30 |
| 3,299,907 | 1/1967 | Wolcott | 138—46 XR |
| 2,875,788 | 3/1959 | Pier | 138—30 |

LAVERNE D. GEIGER, *Primary Examiner.*

B. E. KILE, *Assistant Examiner.*